United States Patent
Takada et al.

(10) Patent No.: US 12,409,837 B2
(45) Date of Patent: Sep. 9, 2025

(54) VEHICLE CONTROL DEVICE AND METHOD

(71) Applicant: Honda Motor Co., Ltd., Tokyo (JP)

(72) Inventors: Ryo Takada, Tokyo (JP); Katsuhito Kambe, Tokyo (JP); Kazuya Moriyama, Tokyo (JP); Naoki Tsuchiya, Tokyo (JP); Fumitaka Abe, Tokyo (JP); Yosuke Horiuchi, Tokyo (JP); Yurina Morimoto, Tokyo (JP); Taichi Kitamura, Tokyo (JP); Shun Saigusa, Tokyo (JP); Ikuo Nonaga, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 88 days.

(21) Appl. No.: 18/583,804

(22) Filed: Feb. 21, 2024

(65) Prior Publication Data
US 2024/0326812 A1 Oct. 3, 2024

(30) Foreign Application Priority Data

Mar. 29, 2023 (CN) .......................... 202310318194.9

(51) Int. Cl.
*B60W 30/18* (2012.01)
*B60W 10/11* (2012.01)
*B60W 10/188* (2012.01)

(52) U.S. Cl.
CPC ....... *B60W 30/18118* (2013.01); *B60W 10/11* (2013.01); *B60W 10/188* (2013.01); *B60W 2520/10* (2013.01); *B60W 2552/15* (2020.02)

(58) Field of Classification Search
CPC ............ B60W 30/18118; B60W 10/11; B60W 10/188; B60T 7/12; B60T 7/085
See application file for complete search history.

(56) References Cited

U.S. PATENT DOCUMENTS

| | | | | |
|---|---|---|---|---|
| 2012/0010792 A1* | 1/2012 | Nedorezov | ............. | F02N 11/00 701/54 |
| 2018/0029577 A1* | 2/2018 | Beauvais | ................ | B60T 8/176 |

(Continued)

FOREIGN PATENT DOCUMENTS

| | | | | |
|---|---|---|---|---|
| CN | 110962813 A | * | 4/2020 | ................ B60T 7/04 |
| JP | 2009166656 | | 7/2009 | |

OTHER PUBLICATIONS

Su (Year: 2020).*

*Primary Examiner* — George C Jin
(74) *Attorney, Agent, or Firm* — JCIPRNET

(57) ABSTRACT

A vehicle control device and method includes: a gear shift member having a parking brake, a drive gear, and a park gear; a hydraulic brake decelerating the vehicle; a vehicle speed detection member; a control switch, which, when pressed, simultaneously activating the parking brake and the park gear; a control member. When the control member determines the vehicle speed exceeds a first threshold during an operation of the control switch, the vehicle remains in a drive gear state, and the hydraulic brake is activated to decelerate the vehicle; when the control member determines the vehicle speed is lower than the first threshold, the vehicle stays in the drive gear state, and the parking brake is activated. When the vehicle speed changes from the first to a second threshold, the hydraulic brake stops operating, the gear shift member shifts to the park gear, and the parking brake is maintained.

8 Claims, 4 Drawing Sheets

(56) References Cited

U.S. PATENT DOCUMENTS

| | | | |
|---|---|---|---|
| 2018/0072292 A1* | 3/2018 | Renaud | B60T 13/686 |
| 2019/0031162 A1* | 1/2019 | Besier | B60T 8/176 |
| 2019/0135249 A1* | 5/2019 | Fridman | B60T 1/10 |
| 2022/0170545 A1* | 6/2022 | Schlegelmilch | B60T 1/062 |
| 2024/0034301 A1* | 2/2024 | Deckmyn | B60W 10/08 |
| 2024/0239319 A1* | 7/2024 | M R | B60T 7/085 |

* cited by examiner

VEHICLE CONTROL DEVICE AND METHOD

CROSS-REFERENCE TO RELATED APPLICATION

This application claims the priority benefit of Chinese application no. 202310318194.9, filed on Mar. 29, 2023. The entity of the above-mentioned patent application is hereby incorporated by reference herein and made a part of this specification.

BACKGROUND

Technical Field

The disclosure relates to a vehicle control device and method.

Description of Related Art

According to a known control method in the related art, when an electronic parking brake (EPB) switch of a vehicle is pulled while the vehicle is in motion, emergency braking (dynamic EPB) is initiated. In addition, the current dynamic EPB control incorporates a recognized control method involving a shift to an N gear (the neutral gear).

Besides, to streamline driver operations, a P gear switch of a gear shifter and the EPB switch are integrated. However, this integration eliminates the ability to operate the EPB independently.

Patent Document 1 (Japan patent application laid-open no. 2009-166656 A) describes a brake control system capable of applying a sufficient braking force to halt a vehicle when engaging a parking brake while the vehicle is in motion. In the related art, a dedicated switch (e.g., an EPB switch) activates the parking brake at low vehicle speeds, while a control to decelerate the vehicle is executed at high speeds. This approach relies on the recognition of the driver to operate the parking brake switch, leading to the vehicle engaging the parking brake or a braking brake based on the vehicle speed. However, this is different from the driver's intention (deceleration/stop).

Moreover, in vehicles where the park gear (the P gear) switch of the gear shifter and the parking brake switch are integrated to minimize driver operations, there is a room for enhancement in achieving behavior aligned with the driver's intention, even when using a switch with functions beyond the parking brake.

However, how to optimize the integrated control switch, combining the park gear switch and the parking brake switch, poses a challenge.

SUMMARY

The disclosure relates to a vehicle control device and method, where an operation of a control switch is changed in response to a driving state (a vehicle speed) of a vehicle.

According to an embodiment of the disclosure, a vehicle control device configured to control a vehicle is provided. The vehicle control device includes a gear shift member, having a parking brake which keeps the vehicle in a stationary state, a drive gear which propels the vehicle, and a park gear which keeps the vehicle in a parked state; a hydraulic brake, decelerating the vehicle; a vehicle speed detection member, detecting a vehicle speed of the vehicle; a control switch, disposed at the gear shift member, wherein while the control switch is being pressed, the parking brake is activated and the park gear is engaged simultaneously; a control member, configured to control following actions. Whether the vehicle speed is higher or lower than a first threshold and whether the vehicle speed is below a second threshold are determined. When the vehicle speed is higher than the first threshold, while the control switch is being operated, the gear shift member remains in a drive gear state, and the hydraulic brake is activated to control a deceleration of the vehicle. At a time point when the vehicle speed becomes lower than the first threshold, the gear shift member stays in the drive gear state, and the parking brake is applied. At a time point when the vehicle speed changes from the first threshold to the second threshold, the hydraulic brake ceases operation, the gear shift member shifts to the park gear, and the parking brake is maintained.

According to an embodiment of the disclosure, in the vehicle control device, the first threshold is greater than the second threshold.

According to an embodiment of the disclosure, the vehicle control device further includes a slope detection member, configured to detect a slope of a road surface; a hydraulic pressure maintaining member, configured to maintain a hydraulic pressure generated based on a driver's operation on a brake pedal; a gear state detection member, configured to detect a gear mode set by the gear shift member; a park gear state detection member, configured to detect an operation state of the parking brake. When the slope detection member detects that the slope is equal to or greater than a slope threshold and while the control switch is being operated, the hydraulic pressure maintaining member maintains the hydraulic pressure until the gear state detection member detects the park gear and the park gear state detection member detects that an operation of the parking brake is completed.

According to an embodiment of the disclosure, in the vehicle control device, when the vehicle is started and the slope detection member detects that the slope is above the slope threshold, after the gear state detection member detects a shift to a gear mode other than the park gear, and at the time of releasing a linked parking control, the hydraulic pressure maintaining member maintains the hydraulic pressure until the park gear state detection member detects that the release of the parking brake is completed.

According to an embodiment of the disclosure, a vehicle control method for controlling a vehicle is provided. A vehicle control device of the vehicle includes a gear shift member, having a parking brake which keeps the vehicle in a stationary state, a drive gear which propels the vehicle, and a park gear which keeps the vehicle in a parked state; a hydraulic brake, decelerating the vehicle; a vehicle speed detection member, detecting a vehicle speed of the vehicle; and a control switch, simultaneously activating the parking brake and engaging the park gear while the control switch is being pressed. The vehicle control method includes: determining whether the vehicle speed of the vehicle is higher or lower than a first threshold and whether the vehicle speed is below a second threshold; when the vehicle speed is higher than the first threshold, and while the control switch is being operated, keeping the gear shift member to be in a drive gear state and activating the hydraulic brake to control a deceleration of the vehicle; at a time point when the vehicle speed becomes lower than the first threshold, keeping the gear shift member to be in the drive gear state and applying the parking brake; at a time point when the vehicle speed changes from the first threshold to the second threshold, stopping operating the hydraulic brake, shifting the gear shift member to the park gear, and maintains the parking brake.

According to an embodiment of the disclosure, in the vehicle control method, the first threshold is greater than the second threshold.

According to an embodiment of the disclosure, the vehicle control method further includes detecting a slope of a road surface; maintaining a hydraulic pressure generated based on a driver's operation on a brake pedal; detecting a gear mode set by the gear shift member; detecting an operation state of the parking brake; when the slope is detected to be equal to or greater than a slope threshold and while the control switch is being operated, maintaining the hydraulic pressure until it is detected that the parking gear is engaged and an operation of the parking brake is completed.

According to an embodiment of the disclosure, the vehicle control method further includes: when the vehicle is started and the slope is detected to be above the slope threshold, after detecting a shift to a gear mode other than the parking gear, and at the time of releasing a linked parking control, maintaining the hydraulic pressure until it is detected that the release of the parking brake is completed.

According to one or more of the embodiments of the disclosure, the operation of the parking brake and the shift to the park gear are integrated into one single control switch. When the control switch is pressed for a predetermined time, the parking brake and the shift to a P gear are linked and operated, thus reducing the number of components that a driver must operate. The operability of the driver is improved by performing the above operations, and different behaviors may be executed according to the driver's intention, thereby improving the marketability.

In one or more of the embodiments of the disclosure, even if the control switch (implemented as a park gear switch) integrates the P gear of the gear shifter and the operation switch of the electronic parking brake (EPB), according to the vehicle speed, the operation of the parking brake (deceleration caused by the hydraulic brake, i.e., the dynamic EPB) may be executed at high speeds, and the operation of the park gear shifter (i.e., shift to the park gear) and the operation of the EPB may be executed at low speeds. As a result, one single control switch capable of executing two functions may be obtained.

DESCRIPTION OF THE EMBODIMENTS

Figure 1:
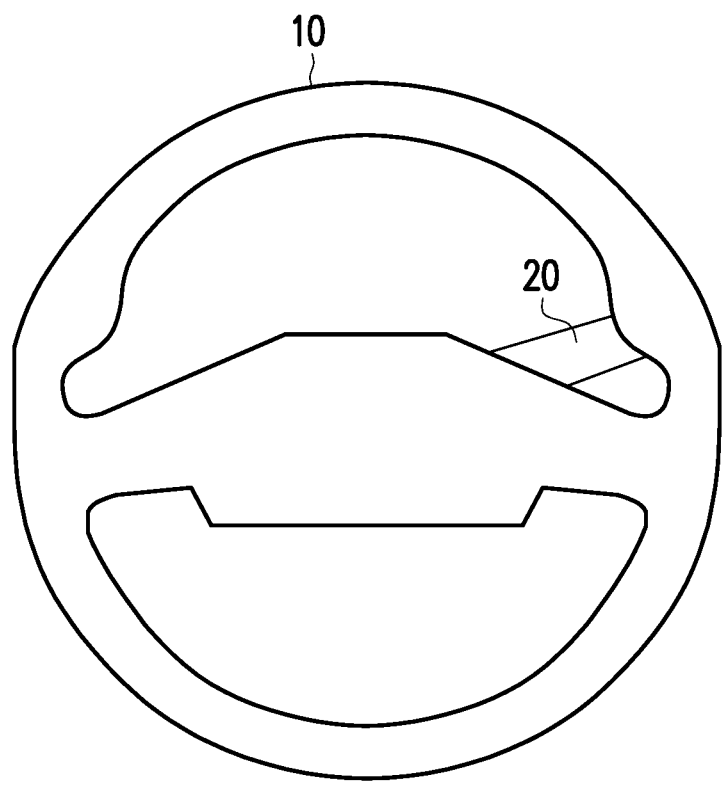
FIG. 1 exemplarily illustrates a placement of a steering wheel and a gear shifter of a vehicle.

Reference will now be made in detail to the exemplary embodiments of the disclosure, examples of which are illustrated in the accompanying drawings. Wherever possible, the same reference numbers are used in the drawings and the description to refer to the same or similar parts.

To address the previously mentioned issue, the disclosure aims at enhancing the usability of the integrated control switch for the park gear switch and the parking brake switch. Additionally, the disclosure aims to elevate traffic safety and contributes to the advancement of sustainable transportation systems.

Figure 2:
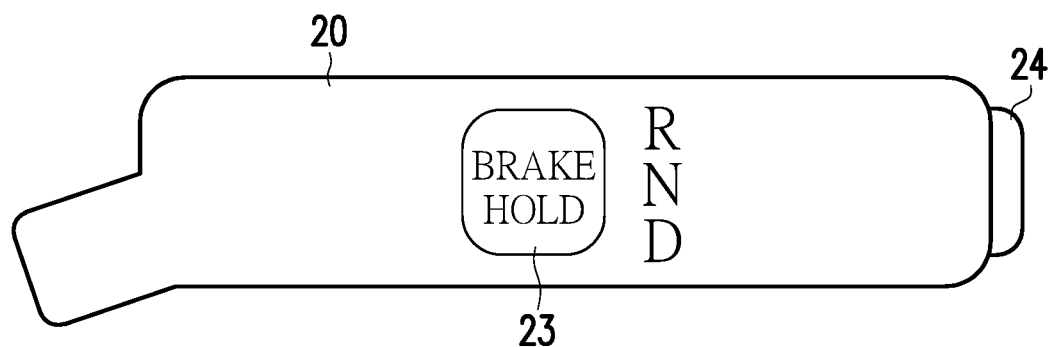
FIG. 2 exemplarily illustrates placement of the gear shifter according to an embodiment of the disclosure.
Figure 3:
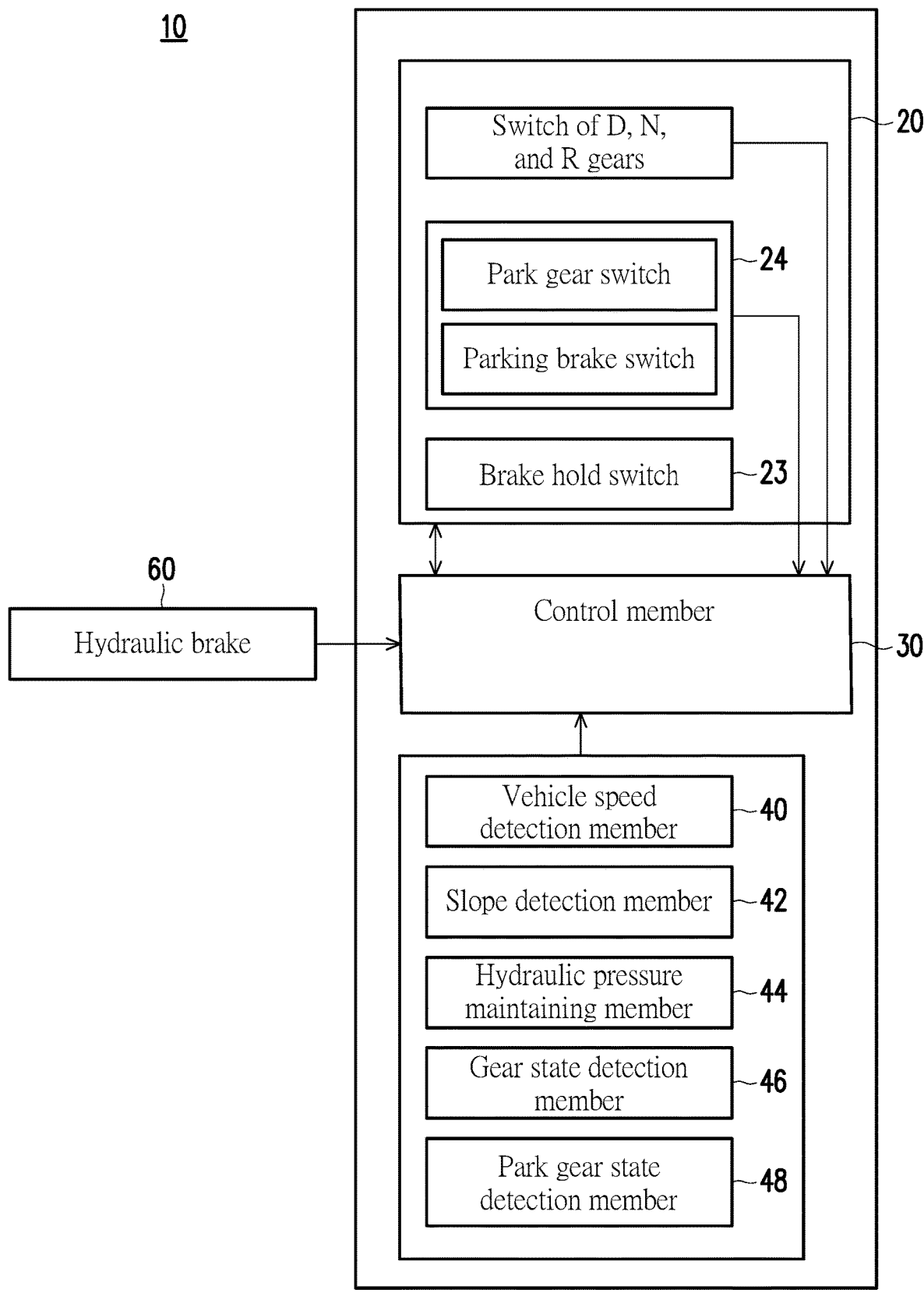
FIG. 3 illustrates a schematic block diagram of a vehicle control device according to an embodiment of the disclosure.

FIG. 1 exemplarily illustrates a placement of a steering wheel and a gear shifter of a vehicle. FIG. 2 exemplarily illustrates a placement of the gear shifter according to an embodiment of the disclosure. FIG. 3 shows a schematic block diagram of a vehicle control device according to an embodiment of the disclosure.

As shown in FIG. 1, a gear shifter (also known as a gear shift member) 20 of a vehicle is disposed at a steering column (not shown) where a steering wheel 28 of the vehicle is mounted, which is simply an exemplary embodiment, and the gear shifter 20 may also be placed at other locations convenient for a driver's operation, which should not be construed as a limitation in the disclosure.

As shown in FIG. 2 and FIG. 3, the gear shifter 20 includes functions of an electronic parking brake (EPB) switch EPBSW (executed by a control switch 24) and a park gear switch PSW (executed by the control switch 24). The parking brake is configured to keep the vehicle in a stationary state, preventing the vehicle from moving. The park gear is to maintain the vehicle in a parked position.

Here, drive gear modes of a typical automatic transmission vehicle may at least include a drive gear (D), a neutral gear (N), and a reverse gear (R). A gear shift of the gear shifter is, for instance, performed by operating the gear shifter 20 to switch among the D, N, and R gears. The shift to the D, N, and R gears of the gear shifter 20 may be implemented in any existing manner and should not be construed as a limitation in the disclosure.

Besides, the gear shifter 20 may also include a brake hold switch 23. A brake hold refers to a type of automatic parking hold system. The brake hold switch 23 may be implemented in any existing manner and should not be construed as a limitation in the disclosure.

According to an embodiment of the disclosure, the gear shifter 20 includes one control switch 24, which is structured to control the EPB and the operation of shifting to a park gear (P). In other words, the control switch 24 may perform the operation of the parking brake switch EPBSW and the park gear switch PSW, which is mainly determined by a duration of pressing the control switch 24. As shown in FIG. 3, the vehicle control device 10 provided in an embodiment of the disclosure additionally includes a control member 30. The control member 30 is, for instance, a processor that controls the overall operation of the vehicle and may be implemented by an electronic control member (ECU), for instance. In this embodiment, the parking control will be elaborated, while the description of other control parts is omitted. According to the embodiment of the disclosure, the control member 30, for instance, controls the control switch 24 and enables the control switch 24 to execute the operation of the EPB and the operation of shifting to the park gear (P).

When the control member 30 receives pressing information of the control switch 24, especially the pressing time, the control member 30 may compare the pressing time with a prescribed time and accordingly control the parking appropriately. As a result, one control switch 24 is required for performing linked parking during parking or releasing of the EPB switch, and it is not necessary to use two switches, i.e., the park gear switch PSW and the parking brake switch EPBSW. In this embodiment, one control switch 24 is required to be set, and by setting different pressing methods, the control switch 24 may perform two types of parking functions.

Figure 4:
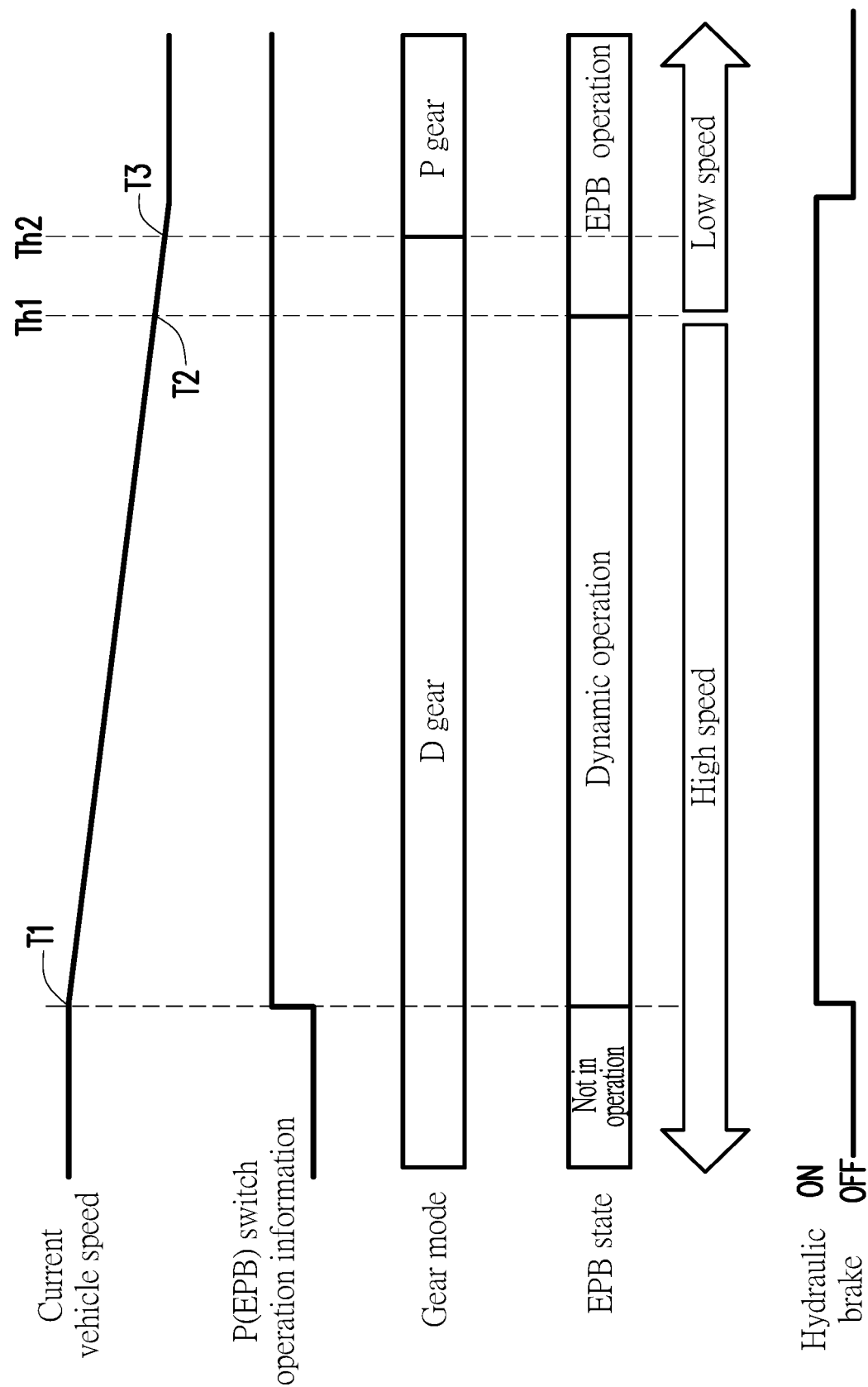
FIG. 4 illustrates a timing diagram of a linked parking operation of the vehicle control device according to an embodiment of the disclosure.

The vehicle control device 10 provided in an embodiment of the disclosure additionally includes a vehicle speed detection member 40, which is configured to detect a current vehicle speed of the vehicle. The vehicle speed may be obtained by detecting a rotation speed by means of a sensor disposed near a wheel of the vehicle. The vehicle speed may also be detected by applying various available sensors, such as performing an image analysis processing after shooting the image with a camera, through radar, through lidar, and other available technical means, which should not be construed as limitations in the disclosure. Besides, as shown in FIG. 4, the control member 30 may also be configured to determine whether the vehicle speed detected by the vehicle speed detection member 40 is higher or lower than a first threshold Th1 and whether the vehicle speed is below the second threshold Th2. In the embodiment of the disclosure, the first threshold Th1 is greater than the second threshold Th2. In an embodiment, the first threshold Th1 is, for instance, 5 Km/h, and the second threshold Th2 is, for instance, 3 Km/h. Here, the data of the first threshold Th1 and the second threshold Th2 exemplified herein simply serve as demonstration examples, and in reality, the data may be appropriately set according to actual needs or types of vehicles.

The vehicle control device 10 provided in an embodiment of the disclosure additionally includes a hydraulic brake 60 configured to decelerate the vehicle. For instance, the braking of the vehicle is accomplished by hydraulically clamping a rotating disc connected to the vehicle wheel through a caliper, thereby decelerating the vehicle. In conventional vehicles, the braking system of the vehicle involves either the driver applying a braking force by stepping on a brake pedal to decelerate the vehicle, i.e., a hydraulic brake 60 provided herein, or manually pulling up a handbrake lever, which is now largely replaced by the EPB.

Next, with reference to FIG. 4, a vehicle control method provided in an embodiment of the disclosure is explained. During a process of the driver driving the vehicle, the vehicle speed detection member 40 continuously detects the vehicle speed, and the control member 30 makes a determination based on the vehicle speed detected by the vehicle speed detection member 40.

Before a time point T1, the vehicle is in the drive gear (D gear), i.e., the vehicle is in motion, and the EPB is not in operation. At this time, the vehicle speed is in a high-speed state. Besides, before the time point T1, the hydraulic brake 60 is not in operation and does not decelerate the vehicle.

After the time point T1, the vehicle speed begins to decrease, the driver operates the control switch 24, and the park gear/parking brake begins to operate. That is, when the driver operates the control switch 24 in case that the vehicle speed is higher than the first threshold Th1, the gear shifter 20 of the vehicle stays in a drive gear (D gear) state. At this time, the control member 30 controls the hydraulic brake 60 to start operating, thereby starting to decelerate the vehicle. During this period (when the vehicle speed is higher than the first threshold Th1), the control member controls the EPB to operate dynamically.

When the vehicle speed detection member 40 detects that the vehicle speed is lower than the first threshold Th1 but higher than the second threshold Th2, i.e., after a time point T2, the control member 30 controls the gear shifter 20 to stay in the drive gear (D gear) state, and at the time point T2 when the vehicle speed reaches the first threshold Th1, the EPB begins to operate. When the vehicle speed starts to be lower than the first threshold Th1, the vehicle speed enters a low-speed state.

When the vehicle speed detection member 40 detects that the vehicle speed has become the second threshold Th2, i.e., at a time point T3, the control member 30 stops the operation of the hydraulic brake 60, and the gear shifter 20 changes the gear mode to the park gear (P gear) and continues to maintain the operation of the EPB.

In other words, after the driver presses the control switch (PSW/EPBSW) 24, when the vehicle speed drops to the first threshold Th1 (at the time point T2), the EPB begins to operate, and the gear mode is the drive gear (D gear); when the vehicle speed drops to the second threshold Th2 (at the time point T3), the EPB continues to operate, and the gear mode shifts from the drive gear (D gear) to the park gear (P gear), so as to complete a linked parking procedure.

In view of the above, within the realm of the above control, the time point T1 is a time point when deceleration begins through the operation of the dynamic EPB, the time point T2 is a time point when the vehicle speed allows the EPB to operate (the vehicle speed drops to the first threshold Th1), and the time point T3 is a time point when the vehicle speed allows to shift into the park gear (P gear).

In the above embodiment, even if the control switch integrates the park gear switch and the operation switch of the parking brake, according to the vehicle speed, the operation of the parking brake (the deceleration resulting from the hydraulic brake, i.e., the dynamic EPB) may be performed at high speeds, and the operation of the gear shifter (i.e., shift to the park gear) may be performed at low speeds. As a result, one single control switch that performs two functions may be obtained.

According to an embodiment of the disclosure, as shown in FIG. 3, the vehicle control device 10 additionally includes a slope detection member 42, a hydraulic pressure maintaining member 44, a gear state detection member 46, and a park gear state detection member 48. The slope detection member 42 is configured to detect a slope of a road surface where the vehicle is located. The hydraulic pressure maintaining member 44 is configured to maintain a hydraulic pressure generated by the hydraulic brake based on a driver's operation on a brake pedal (BP). The hydraulic pressure may be applied to maintain the operation of the hydraulic brake of the vehicle. The gear state detection member 46 is configured to detect the gear mode (DNRP gears) set by the gear shifter 20. The park gear state detection member 48 is configured to detect the operation state of the EPB.

Under such circumstances, the control member 30 controls the vehicle control device 10, especially the control of the linked parking, in the following manner.

Similarly, as shown in FIG. 4, when the slope detection member 42 detects that the slope of the road surface where the vehicle is located is equal to or greater than a slope threshold and while the control switch 24 is being operated, the hydraulic pressure maintaining member 44 maintains the hydraulic pressure of the hydraulic brake 60 until the gear state detection member 46 detects the park gear (P gear) and the park gear state detection member detects that the operation of the EPB is completed.

In the previously described embodiment, for instance, when the vehicle is on a flat road or the slope of the road surface is not steep, even if the control switch 24 is operated for the linked parking, the vehicle does not slide down due to the slope. However, in this embodiment, if the slope of the road surface is at the slope threshold, there is a possibility that the vehicle slides down during the linked parking due to the slope. Therefore, on such a condition, the control member 30 needs to maintain the hydraulic pressure of the hydraulic brake 60 to be at a certain level and ensures the hydraulic pressure functions. This ensures that the vehicle may be brought to a stop without sliding down.

Therefore, according to this embodiment, when the vehicle is parked on a slope, the EPB takes time to fully function. If the hydraulic brake is terminated when the driver stops operating the brake pedal, backlash may occur, and the vehicle may slide down the slope. As such, by maintaining the hydraulic pressure until the EPB functions and the park gear (P gear) is completely locked, backlash may be effectively suppressed, and passenger discomfort may be prevented.

Figure 5:
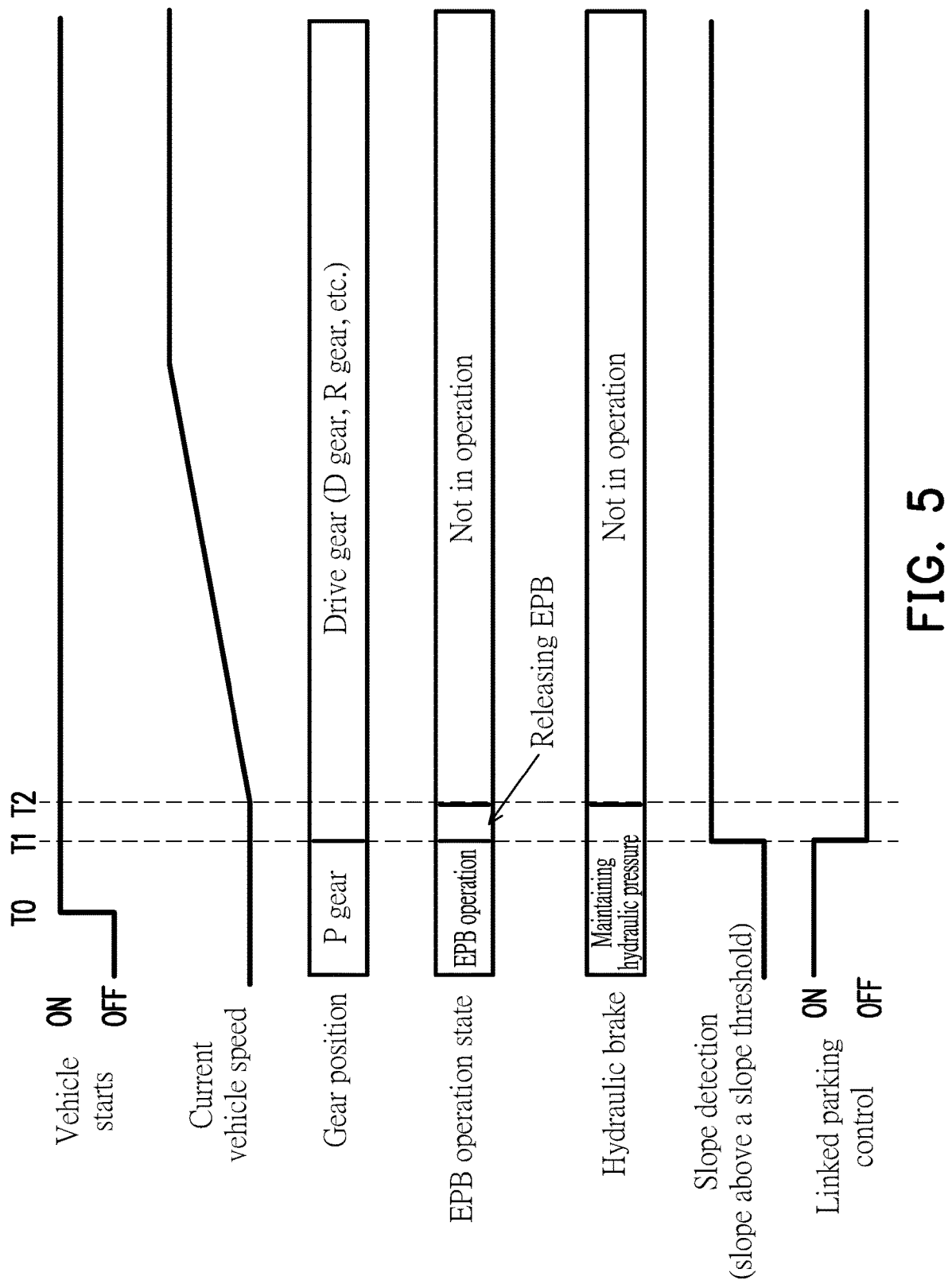
FIG. 5 illustrates a timing diagram of the linked parking operation of the vehicle control device according to an embodiment of the disclosure when the vehicle is started on a slope.

Additionally, another driving pattern of the vehicle moving on a slope is described below, and the driving pattern refers to a change from a stopped state to a driving state. As shown in FIG. 5, the vehicle is started from a stationary state (the vehicle speed is 0) at a time point T0. Before the vehicle is started, the gear mode of the vehicle is the park gear (P gear), and the EPB is in operation.

Next, at the time point T1, the driver of the vehicle shifts the gear shifter from the park gear (P gear) to the drive gear (such as D, R gear, and so on, which is determined based on the parking environment and driving needs). At this time, if the slope detection member 42 detects that the slope of the road surface where the vehicle is located is above the above-mentioned slope threshold, it indicates that the vehicle is parked on a slope. Besides, the time point for the slope detection may also be determined as from the previous time point when the vehicle was parked on a slope. In addition, the gear state detection member 46 detects a change to a gear mode other than the park gear (P gear), such as the drive gear (D gear). That is, the vehicle shifts from the park gear (P gear) to the drive gear (D gear, for instance, when reversing is not required).

At the time point T1, the control member 30 releases the linked parking control and prepares to drive the vehicle, and the EPB also begins to release its operation. Since the vehicle is parked on the slope at this time, to prevent the vehicle from sliding down, the park gear state detection member 48 continues to maintain the hydraulic pressure of the hydraulic brake 60 until the complete release of the operation of the EPB is detected (at the time point T2) by the control member 30, so that the vehicle does not slide down. As such, after the linked parking is released, when the driver of the vehicle shifts to the D gear or the R gear and prepares to drive the vehicle, the hydraulic pressure may still be kept for a period of time to maintain the braking force of the vehicle, so as to prevent the vehicle from sliding down the slope.

After the time point T2, the gear mode of the vehicle has been shifted to the drive gear (such as the D gear) and begins to move, and the vehicle speed gradually increases to maintain a stable driving speed. At the same time, the operation of the EPB is completely released, and the hydraulic brake also stops operating.

Therefore, according to this embodiment, when the vehicle is parked on the slope, it takes time until the release action of the EPB is completed. If the driver stops operating the brake pedal and ends the hydraulic braking, backlash may occur, and the vehicle may slide down the slope. Therefore, by continuing to maintain the hydraulic pressure of the hydraulic brake 60 until the release of the operation of the EPB and the locking action of the park gear (P gear) are completed, backlash may be suppressed, and passenger discomfort may be prevented.

In an embodiment of the disclosure, even if the control switch integrates the park gear switch and the operation switch of the parking brake, according to the vehicle speed, the operation of the parking brake (deceleration resulting from by the hydraulic brake, i.e., the dynamic EPB) may be performed at high speeds, and the operation of the park gear switch (i.e., shift to the park gear) may be performed at low speeds. As a result, one single control switch that performs two functions may be obtained.

Lastly, it should be mentioned that the above embodiments simply serve to illustrate but not to limit the technical solutions provided in an embodiment of the disclosure. Although the disclosure has been described in detail with reference to the above embodiments, persons skilled in the art should understand that the technical solutions described in the above embodiments can still be modified or some or all of the technical features thereof can be equivalently replaced. However, the modifications or replacements do not cause the essence of the corresponding technical solutions to deviate from the scope of the technical solutions of the embodiments of the disclosure.

What is claimed is:

1. A vehicle control device, configured to control a vehicle and comprising:
    a gear shift member, having a parking brake which keeps the vehicle in a stationary state, a drive gear which propels the vehicle, and a park gear which keeps the vehicle in a parked state;
    a hydraulic brake, decelerating the vehicle;
    a vehicle speed detection member, detecting a vehicle speed of the vehicle;
    a control switch, disposed at the gear shift member, wherein while the control switch is being pressed, the parking brake is activated and the park gear is engaged simultaneously; and
    a control member, configured to:
    determine whether the vehicle speed is higher or lower than a first threshold and whether the vehicle speed is below a second threshold;
    wherein in the case that the vehicle speed is higher than the first threshold, while the control switch is being operated, the gear shift member remains in a drive gear state, and the hydraulic brake is activated to control a deceleration of the vehicle;
    at a time point when the vehicle speed becomes lower than the first threshold, the gear shift member stays in the drive gear state, and the parking brake is applied; and
    at a time point when the vehicle speed changes from the first threshold to the second threshold, the hydraulic brake ceases operation, the gear shift member shifts to the park gear, and the parking brake is maintained.

2. The vehicle control device according to claim 1, wherein the first threshold is greater than the second threshold.

3. The vehicle control device according to claim 1, further comprising:
    a slope detection member, configured to detect a slope of a road surface;
    a hydraulic pressure maintaining member, configured to maintain a hydraulic pressure generated based on a driver's operation on a brake pedal;
    a gear state detection member, configured to detect a gear mode set by the gear shift member; and a park gear state detection member, configured to detect an operation state of the parking brake, wherein in the case that the slope detection member detects that the slope is equal to or greater than a slope threshold and while the control switch is being operated, the hydraulic pressure maintaining member maintains the hydraulic pressure until the gear state detection member detects the park gear and the park gear state detection member detects that an operation of the parking brake is completed.

4. The vehicle control device according to claim 3, wherein in the case that the vehicle is started and the slope detection member detects that the slope is above the slope threshold, after the gear state detection member detects a shift to a gear mode other than the park gear, and at the time of releasing a linked parking control, the hydraulic pressure maintaining member maintains the hydraulic pressure until the park gear state detection member detects that the release of the parking brake is completed.

5. A vehicle control method for controlling a vehicle, wherein a vehicle control device of the vehicle comprises: a gear shift member, having a parking brake which keeps the vehicle in a stationary state, a drive gear which propels the vehicle, and a park gear which keeps the vehicle in a parked state; a hydraulic brake, decelerating the vehicle; a vehicle speed detection member, detecting a vehicle speed of the vehicle; and a control switch, simultaneously activating the parking brake and engaging the park gear while the control switch is being pressed, the vehicle control method comprising:

determining whether the vehicle speed of the vehicle is higher or lower than a first threshold and whether the vehicle speed is below a second threshold;

in the case that the vehicle speed is higher than the first threshold, and while the control switch is being operated, keeping the gear shift member to be in a drive gear state and activating the hydraulic brake to control a deceleration of the vehicle;

at a time point when the vehicle speed becomes lower than the first threshold, keeping the gear shift member to be in the drive gear state and applying the parking brake; and at a time point when the vehicle speed changes from the first threshold to the second threshold, stopping operating the hydraulic brake, shifting the gear shift member to the park gear, and maintains the parking brake.

6. The vehicle control method according to claim 5, wherein the first threshold is greater than the second threshold.

7. The vehicle control method according to claim 5, further comprising:

detecting a slope of a road surface;

maintaining a hydraulic pressure generated based on a driver's operation on a brake pedal;

detecting a gear mode set by the gear shift member;

detecting an operation state of the parking brake; and in the case that the slope is detected to be equal to or greater than a slope threshold and while the control switch is being operated, maintaining the hydraulic pressure until it is detected that the park gear is engaged and an operation of the parking brake is completed.

8. The vehicle control method according to claim 7, further comprising:

in the case that the vehicle is started and the slope is detected to be above the slope threshold, after detecting a shift to a gear mode other than the park gear, and at the time of releasing a linked parking control, maintaining the hydraulic pressure until it is detected that the release of the parking brake is completed.

\* \* \* \* \*